United States Patent [19]
Cox

[11] 3,989,428
[45] Nov. 2, 1976

[54] QUICK RELEASE ADJUSTABLE CLAMP FOR RETAINING INSERT IN CYLINDRICAL CONTAINER

[75] Inventor: Sidney R. Cox, Tallapoosa, Ga.

[73] Assignee: Associated Rubber Company, Tallapoosa, Ga.

[22] Filed: May 5, 1976

[21] Appl. No.: 683,388

[52] U.S. Cl. ............................ 425/18; 425/34 A; 425/47
[51] Int. Cl.² ........................................ B29H 5/04
[58] Field of Search .............. 425/18, 28 R, 34 A, 425/40, 47

[56] References Cited
UNITED STATES PATENTS

| | | | |
|---|---|---|---|
| 1,640,500 | 8/1927 | Hansen | 425/34 A |
| 2,440,087 | 4/1948 | Green | 425/18 |
| 2,638,629 | 5/1953 | Heintz | 425/47 X |
| 3,611,499 | 10/1971 | Getty | 425/47 |
| 3,667,882 | 6/1972 | Ross | 425/47 X |
| 3,878,023 | 4/1975 | Dexter | 425/28 R X |
| 3,884,739 | 5/1975 | Hindin et al. | 425/34 A X |
| 3,917,440 | 11/1975 | Huebert | 425/18 |

*Primary Examiner*—J. Howard Flint, Jr.
*Attorney, Agent, or Firm*—Laurence R. Brown

[57] ABSTRACT

For quick release of a press type insert positioned at variable heights within a cylindrical open ended container, a set of peripheral quick release clamps is positioned around the outer rim of the container. Each clamp has a frame member affixed to the container and a single pivoted arm that pivotably moves from a release position outside the cylinder walls to an engaged position in forcible contact with the insert within the open end of the container. A quick release action is provided by a manually removable single retainer pin inserted in the engaged position. Balance of the forces about the insert and the force is adjustable by means of an adjustable screw threaded through the pivotable member to bear upon the insert.

4 Claims, 3 Drawing Figures

QUICK RELEASE ADJUSTABLE CLAMP FOR RETAINING INSERT IN CYLINDRICAL CONTAINER

This invention relates to containers, and more particularly it relates to cylindrical containers having an axially movable insert thereinside held in place with forcible contact against contents of the cylinder.

BACKGROUND

One typical employment of such containers is as a mold in a tire retreading operation, where a set of several tires are held on top of one another in a cylindrical tub under axial pressure while being cured. Such tires are manually loaded and unloaded thereby requiring a removable insert pressure member at the top of the tire stack. Conventionally in the art some mechanisms provide a hydraulic lift with a long stroke. This has a serious disadvantage of the height of the unit required and the dependence upon expensive hydraulic servo systems.

Other mechanisms provide for manually adjustable clamping means comprising a single screw or bayonet assembly axially mounted in the cylinder. This has the significant disadvantage that there is a tendency of the insert to tilt especially under curing pressure. This could lead to release of steam and danger to workers as well as improper cure.

In general, the insert must cause a sealing pressure to be exerted upon a stack of tires which in retreading operations may have mixed dimensions and not be uniform in height. Thus, an axial adjustment of the insert position and force within the cylinder is required. Yet the mold must be easy to operate and not require significant labor in loading and unloading.

OBJECTIVES

It is therefore a primary objective of the invention to provide an improved quick release-adjustable force mechanism for holding an insert at variable axial positions within a cylindrical container.

A more specific object of the invention is to provide an improved tire curing mold assembly.

Another object of the invention is to provide improved quick release adjustable force clamping means.

Further objects, features and advantages of the invention will be found throughout the following description, drawings and claims.

BRIEF DESCRIPTION OF THE INVENTION

Therefore there is provided by this invention an open end cylindrical tub having thereinside a positionable, removable insert for forcefully bearing upon the contents of the tub, for example a stack of tires during curing. The insert is forcefully held in position at selected axial positions by means of a plurality of quick release clamping members disposed about the upper rim of the tub. The operating member of each clamp is a simply constructed single piece pivotable arm with an adjustment screw threaded therethrough hinged on a pivot frame on the rim of the tub to extend over the insert in one position and to be outside the tub walls in another position. The clamps are held in place during cure simply by a manually removable pin insert.

THE DRAWING

A preferred embodiment is set forth in the accompanying drawing wherein:

FIG. 1 is a perspective assembly view, partly broken away of a tire mold embodiment of the invention, FIG. 2 is a side view of the pivot arm of the clamp assembly, and FIG. 3 is a perspective view of the clamp assembly.

DETAILED DESCRIPTION

Figure 1:
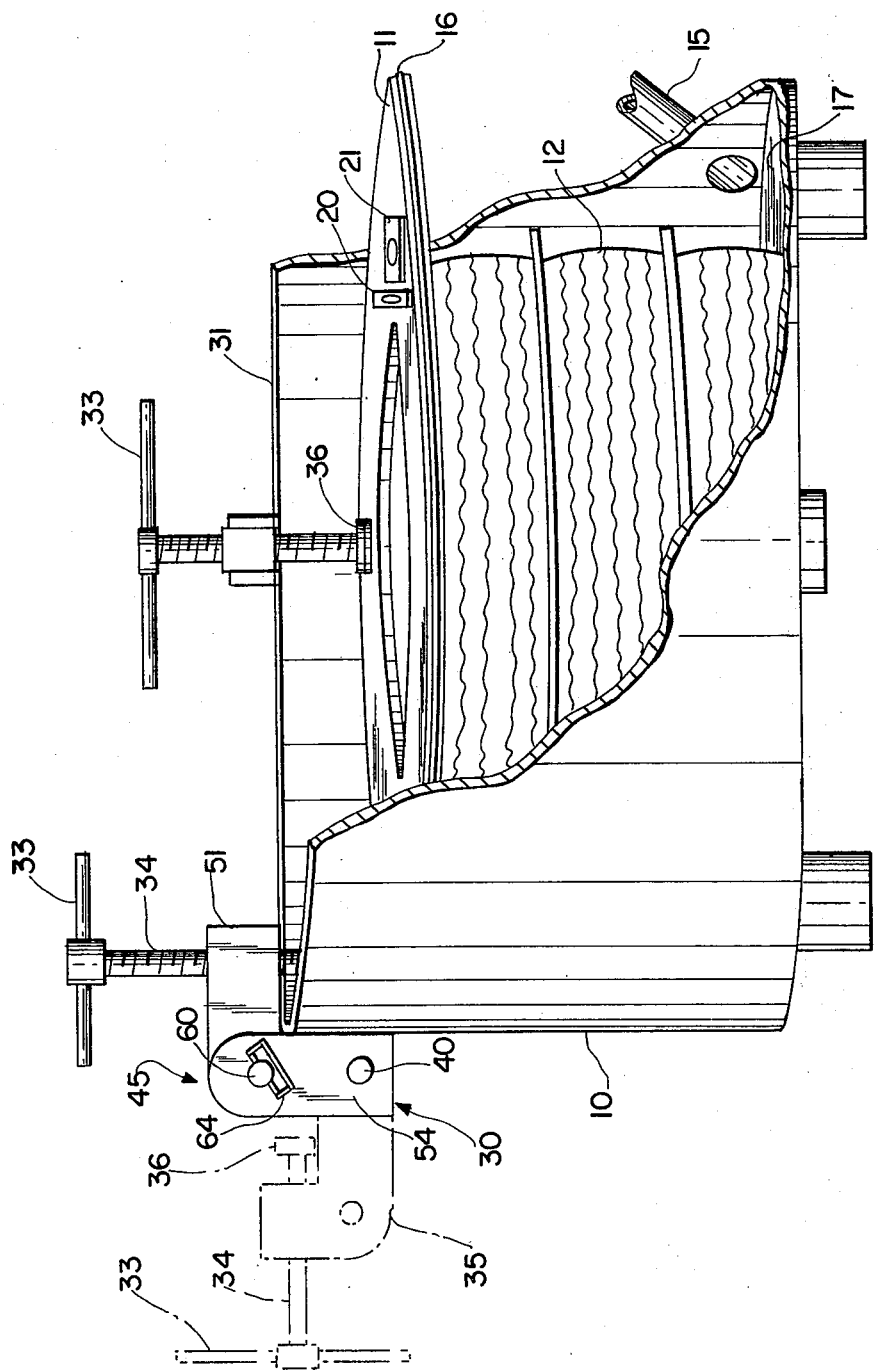
Figure 2:
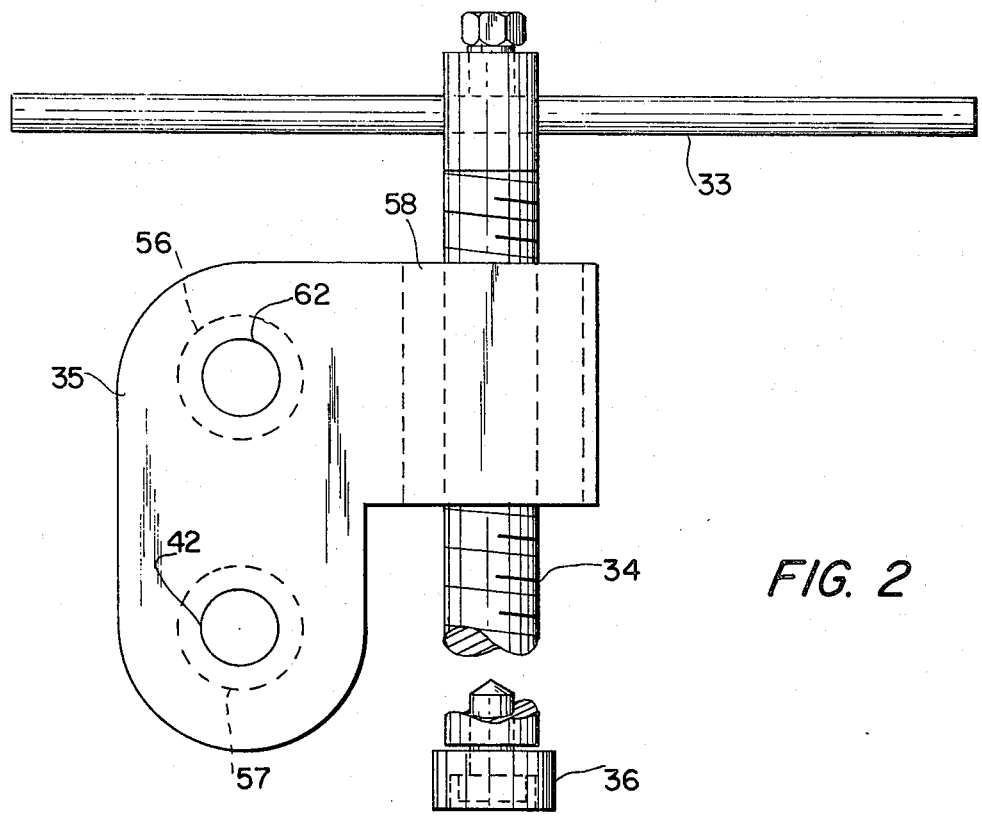

Referring now to the various views, wherein similar reference characters identify similar parts throughout to facilitate comparison, it is seen that an open ended cylindrical container tub 10 has an insert 11 therein adapted to be axially positioned within the container 10 at a variable axial height or position depending upon the container contents. For use in curing tires 12, the container 10 is supplied with heating means such as steam pipe 15 or alternatively electrical heaters. The sealing ring 16 about insert 11 permits a tight fit of the insert 11 within the open mouth of container 10.

It is desirable to clamp the tires 12 by insert 11 against the cylinder bottom 17 during the curing process to provide proper mold pressure which is retained during curing. Typically the tires are retreaded by wrapping with a tread strip having therein pre-molded a tread design, where the curing operation vulcanizes the tread to the casing under heat and pressure conditions well known in the art. Because of the pressure involved and the variations in casing size and brand used in a retreading operation, it is highly desirable to have a reasonable range of positioning the insert 11 in a clamping attitude. The problem is accentuated by the simultaneous multiple curing of a stack of tires 12, which is desirable to reduce time and cost.

Additionally, the insert 11 must be level, as may be indicated by two normally positioned air bubble level means 20, 21 for example. If it becomes tilted, steam may be released to reduce curing efficiency and cause possible danger to shop personnel. Furthermore it may permit the tread to be improperly affixed.

To apply proper pressure in loading and to assure that the insert 11 is level, a set of three clamp assemblies 30 is positioned around the rim 31 of cylindrical tub 10. Each clamp is manually adjusted by crossbar 33 which adjusts screw 34 affixed in threads within a single movable clamp member comprising pivot arm 35. The required force can be established by judgment of the operator on manual tightening of the clamp screws 34 to bear against insert 11 with a bearing footpiece 36. Alternatively a conventional force gage (not shown) may be used.

The clamp assembly 30 is simple yet it has a quick release feature made possible by pivoting the arm member 35 about a pivot pin 40 which snugly fits in bearing aperture 42 of both the mounting frame piece 45 and the pivot arm 35. Preferably both the pivot arm 35 and frame piece 45 have a pair of spaced side panel members 50, 51 and 53, 54 respectively. The pivot arm 35 has cylindrical bearings 56, 57 affixed between the side panel members 50, 51 such as by welding, as well as a nut block 58 having a threaded aperture with threads mating those of screw 34.

Figure 3:
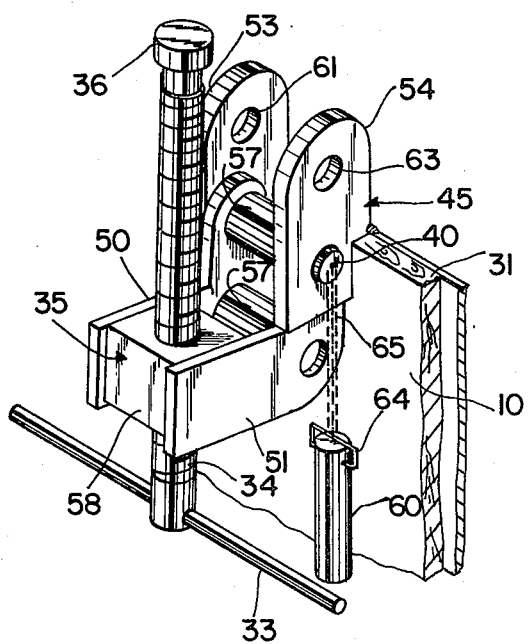

As may be seen from FIGS. 1 and 3 the pivot arm 35 may be placed in two positions, namely a disengaged position outside the cylinder 10 and an engaged position with the screw 34 extending over the open end of cylindrical tub 10 to bear upon the insert cover 11, by means of pivot position about the pivot axis defined by pivot pin 40.

A simple quick release locking means is provided by removable pin 60, which snugly fits through bearing apertures 61, 62, 63 of the frame 45 and pivot arm 35 to serve as a retainer of the clamp in engaged position to provide the required bearing pressure adjustable by means of screws 34. A handle 64 is provided on pin 60 with retention chain 65 for facilitating quick manual release of the clamps so that the insert cover 11 and the tires 12 may be removed from the tub after cure. Thus, the pressure applied by screws 34 may be released by a quick manual back off by rotation of crossbars 33 and the pins 60 removed to move the clamps into their disengaged position.

It is evident from the foregoing preferred embodiment, that an inexpensive reliable clamping arrangement is provided by this invention that functionally serves to improve the state of the art and to provide a novel combination not heretofore available. Those novel features in combination believed descriptive of the spirit and nature of the invention are set forth with particularity in the appended claims.

I claim:

1. Container means comprising in combination, a substantially cylindrical container having an open end for receiving contents disposed at variable heights therein, a removable insert fitting inside said open end to rest upon said contents of the container disposed at variable heights therein, and adjustable quick release clamping means for holding said insert in place with predetermined force against said contents, said clamping means comprising a set of pivot frame members affixed to said container around its rim, a single pivoting arm member registering with each frame member at a pivot axis to pivot thereabout from a first disengaged position outside said open end to a second engaged position extending over said open end, an adjustable clamp positioned in said pivoting member to extend over said insert in the second position to bear into forcible contact with said insert with a force determined by the adjustment of said clamp, and quick release locking means for holding the pivoting member in said second position constituting a manually removable pin registering snugly through an aperture through both said pivot frame and said pivoting member and having a manually operable structure thereon to facilitate entry and removal from said apertures thereby serving as a quickly removable retainer for holding said pivoting member in said second position.

2. Container means as defined in claim 1 with said container constructed with heating means for simultaneously curing treads on a plurality of stacked automobile tires forcibly held in said container under axial pressure by said insert while being cured.

3. Container means as defined in claim 1, wherein said adjustable clamp comprises a longitudinal screw member, mating threads defined about an aperture through said pivoting arm member, and a crossbar lever arm extending normal to the axis of the screw member for manual adjustment of the clamping force.

4. Container means as defined in claim 1, wherein said pivot frame members comprise a set of spaced parallel plates disposed on opposite sides of said pivoting arm member receiving said pivoting arm member therebetween.

* * * * *